(12) United States Patent
Kakimoto

(10) Patent No.: US 11,073,817 B2
(45) Date of Patent: Jul. 27, 2021

(54) CUTTING CONDITION VERIFICATION DEVICE

(71) Applicant: FANUC Corporation, Yamanashi (JP)

(72) Inventor: Takashi Kakimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 16/221,602

(22) Filed: Dec. 17, 2018

(65) Prior Publication Data

US 2019/0196451 A1 Jun. 27, 2019

(30) Foreign Application Priority Data

Dec. 27, 2017 (JP) .............................. JP2017-251070

(51) Int. Cl.
*G06F 19/00* (2018.01)
*G05B 19/4093* (2006.01)
*G05B 19/18* (2006.01)
*G05B 19/4065* (2006.01)
*G05B 19/409* (2006.01)

(52) U.S. Cl.
CPC ..... *G05B 19/40938* (2013.01); *G05B 19/182* (2013.01); *G05B 19/409* (2013.01); *G05B 19/4065* (2013.01); *G05B 2219/45044* (2013.01)

(58) Field of Classification Search
CPC .......... G05B 19/182; G05B 19/4065; G05B 19/409; G05B 19/40938; G05B 2219/45044; G05B 19/4068; G05B 2219/35291
See application file for complete search history.

(56) References Cited

U.S. PATENT DOCUMENTS

| 5,255,201 | A | 10/1993 | Maeda | |
|---|---|---|---|---|
| 6,505,092 | B1* | 1/2003 | Fukaya | G05B 19/4068 700/179 |
| 10,585,417 | B2* | 3/2020 | Takayama | G05B 19/40938 |
| 2015/0253760 | A1* | 9/2015 | Tateno | G05B 19/4097 700/83 |
| 2016/0224004 | A1 | 8/2016 | Kurosumi | |
| 2016/0266574 | A1* | 9/2016 | Legoupi | G05B 19/4155 |

FOREIGN PATENT DOCUMENTS

| CN | 105843172 A | 8/2016 |
|---|---|---|
| JP | H03282909 A | 12/1991 |
| JP | H9-62326 A | 3/1997 |

\* cited by examiner

*Primary Examiner* — Zhipeng Wang
(74) *Attorney, Agent, or Firm* — Hauptman Ham, LLP

(57) ABSTRACT

A cutting condition verification device configured to extract a cutting condition setting mistake in a machining program is provided with a program editing unit for creating or editing the machining program, a cutting condition extraction/storage unit configured to extract a cutting condition from the machining program, a cutting condition reference value calculation unit configured to calculate reference values for determining the normality or abnormality of the cutting condition, based on a description of another machining program executed in the past, a cutting condition determination unit configured to determine the normality or abnormality of the cutting condition, based on the reference values, and a cutting condition deviation command display unit configured to display the cutting condition determined to be abnormal in a table form.

8 Claims, 6 Drawing Sheets

FIG.3

| TOOL ID | S | F | MATERIAL |
|---|---|---|---|
| 23 | 1400 | 150 | SK |
| 23 | 1400 | 150 | SK |
| 23 | 1400 | 140 | SK |
| 23 | 1500 | 140 | SC50 |
| 24 | 600 | 200 | SC50 |
| 24 | 600 | 180 | SC50 |
| 24 | 600 | 200 | SC50 |
| 24 | 600 | 200 | SC50 |
| 24 | 600 | 200 | SC50 |

PROGRAM (EXECUTED IN THE PAST)
```
..
G0G17G97G98X1030.Z200.Y0
G28V0
G97S1500
G0X0Y0Z5.T23
Z2.
G1Z-50.5F140
G0U-0.4
Z5.
G0G17G40G80X1030.Z200.Y0T0
M1
G4U3.
G0G17G97G98X1030.Z200.Y0
G28V0
G97S600
G0X104.Y-52.Z5.T24
Z-10.
G1Z-18.F200
W0.2
M72
G0U-0.4
Z5.
..
```

FIG.4

TABLE

| TOOL ID | S | F | MATERIAL |
|---|---|---|---|
| .. | .. | .. | .. |
| 23 | 1200 | 140 | SC50 |
| 24 | 580 | 170 | SC50 |
| 23 | 1300 | 140 | SC50 |
| .. | .. | .. | .. |

PROGRAM (BEING CREATED OR EDITED)

TABLE

| TOOL ID | S | F | MATERIAL |
|---|---|---|---|
| .. | .. | .. | .. |
| 23 | 1200 | 140 | SC50 |
| 24 | 580 | *150* | SC50 |
| 23 | *1300* | 140 | SC50 |
| .. | .. | .. | .. |

PROGRAM (BEING CREATED OR EDITED)

| TOOL ID | S | F | MATERIAL |
| --- | --- | --- | --- |
| 1 | 1400 | 150 | SC50 |
| 1 | 1400 | 150 | SC50 |
| 1 | 1500 | 140 | SC50 |
| 1 | 1500 | 140 | SC50 |
| 1 | 1400 | 140 | SC50 |
| 1 | 1400 | 140 | SC50 |
| 1 | 1500 | 150 | SC50 |
| 1 | 1500 | 150 | SC50 |
| 1 | 1500 | 140 | SC50 |

FIG.7

TABLE

| TOOL ID | S | F | REFERENCE VALUE S | REFERENCE VALUE F | MATERIAL |
| --- | --- | --- | --- | --- | --- |
| ⋮ | ⋮ | ⋮ | ⋮ | ⋮ | ⋮ |
| 23 | *1200* | 140 | 1450 | 145 | SC50 |
| 24 | 580 | *170* | 600 | 196 | SC50 |
| ⋮ | ⋮ | ⋮ | ⋮ | ⋮ | ⋮ |

CUTTING CONDITION VERIFICATION DEVICE

RELATED APPLICATIONS

The present application claims priority of Japanese Application Number 2017-251070, filed on Dec. 27, 2017, the disclosure of which is hereby incorporated by reference herein in its entirety.

BACKGROUND OF THE INVENTION

Field of the Invention

The present invention relates to a cutting condition verification device, and more particularly, to a cutting condition verification device capable of detecting programming mistakes in cutting conditions.

Description of the Related Art

Cutting conditions (feed rate, spindle speed, etc.) adapted to tools used for machining are described in a machining program. For example, descriptions related to the cutting conditions in the machining program are often manually corrected in the process of repeating trial machining. When this is done, the cutting conditions may possibly be wrongly set, so that there is a demand for a means capable of easily detecting programming mistakes.

For example, Japanese Patent Application Laid-Open No. 09-062326 describes an NC machining device for cutting work using a plurality of tools. In this device, appropriate cutting conditions for each tool used are previously stored in a data base, the cutting conditions of the tools described in the machining program are compared with the appropriate cutting conditions defined in the data base, and those portions of the machining program which include excessive or insufficient cutting conditions are highlighted.

Moreover, there is a well-known technique, as a related art, to refer to information (catalog data) such as cutting conditions related to tools used for machining through a network such as the Internet.

However, in the technique described in Japanese Patent Application Laid-Open No. 09-062326, it is necessary to previously investigate and organize the appropriate cutting conditions and create the data base, thus requiring vast resources.

Furthermore, it is conceivable to utilize the catalog data of each tool as reference values for automatically determining programming mistakes. However, the catalog data indicates only typical cutting conditions and is not necessarily coincident with optimal cutting conditions obtained by adjustment based on trial machining or the like. Thus, it is to be desired that the programming mistakes be detected based on the optimal cutting conditions that vary depending on each machine and workpiece material.

SUMMARY OF THE INVENTION

The present invention has been made to solve the above problems and has an object to provide a cutting condition verification device capable of detecting programming mistakes in cutting conditions.

A cutting condition verification device according to one embodiment of the present invention is a cutting condition verification device configured to extract a cutting condition setting mistake in a machining program and comprises a program editing unit for creating or editing the machining program, a cutting condition extraction/storage unit configured to extract a cutting condition from the machining program, a cutting condition reference value calculation unit configured to calculate reference values for determining the normality or abnormality of the cutting condition, based on a description of another machining program executed in the past, a cutting condition determination unit configured to determine the normality or abnormality of the cutting condition, based on the reference values, and a cutting condition deviation command display unit configured to display the cutting condition determined to be abnormal in a table form.

In the cutting condition verification device according to the one embodiment of the invention, the cutting condition deviation command display unit highlights the cutting condition determined to be abnormal in the table-form display.

In the cutting condition verification device according to the one embodiment of the invention, the cutting condition deviation command display unit displays the machining program in a corresponding portion in the table-form display reached in a jump when the cutting condition determined to be abnormal is selected.

In the cutting condition verification device according to the one embodiment of the invention, the cutting condition deviation command display unit reflects the content of the editing in a corresponding portion of the machining program in the table-form display when the cutting condition determined to be abnormal is edited.

The cutting condition verification device according to the one embodiment of the invention further comprises a program execution unit configured to execute the machining program, a cutting condition history collection unit configured to collect cutting conditions at the time of execution of the machining program, and a cutting condition history data base in which the collected cutting conditions are accumulated, and the cutting condition reference value calculation unit calculates the reference values based on the cutting condition history data base.

In the cutting condition verification device according to the one embodiment of the invention, the cutting condition reference value calculation unit calculates a mean value, a maximum value, and a mode for each tool and each workpiece material as the reference values, based on the cutting condition history data base.

A cutting condition verification device according to one embodiment of the present invention is a cutting condition verification device configured to extract a cutting condition setting mistake in a machining program and comprises a program editing unit for creating or editing the machining program, a cutting condition extraction/storage unit configured to extract a cutting condition from the machining program, a cutting condition reference value calculation unit configured to calculate reference values for determining the normality or abnormality of the cutting condition, based on a description of the machining program, a cutting condition determination unit configured to determine the normality or abnormality of the cutting condition, based on the reference values, and a cutting condition deviation command display unit configured to display the cutting condition determined to be abnormal in a table form.

The cutting condition verification device according to the one embodiment of the invention further comprises a cutting condition history collection unit configured to collect cutting conditions from the machining program and a cutting condition history data base in which the collected cutting conditions are accumulated, and the cutting condition reference value calculation unit calculates the reference values based on the cutting condition history data base.

According to the present invention, there can be provided a cutting condition verification device capable of detecting programming mistakes in cutting conditions.

BRIEF DESCRIPTION OF THE DRAWINGS

The above and other objects and features of the present invention will be obvious from the ensuing description of embodiments with reference to the accompanying drawings, in which:

FIG. 3 is a diagram showing an operation of a cutting condition verification device according to Example 1;

FIG. 4 is a diagram showing an operation of the cutting condition verification device according to Example 1;

FIG. 5 is a diagram showing an operation of a cutting condition verification device according to Example 2;

FIG. 6 is a diagram showing an operation of a cutting condition verification device according to Example 3; and FIG. 7 is a diagram showing an operation of a cutting condition verification device according to another practical example.

DETAILED DESCRIPTION OF THE PREFERRED EMBODIMENTS

Figure 1:
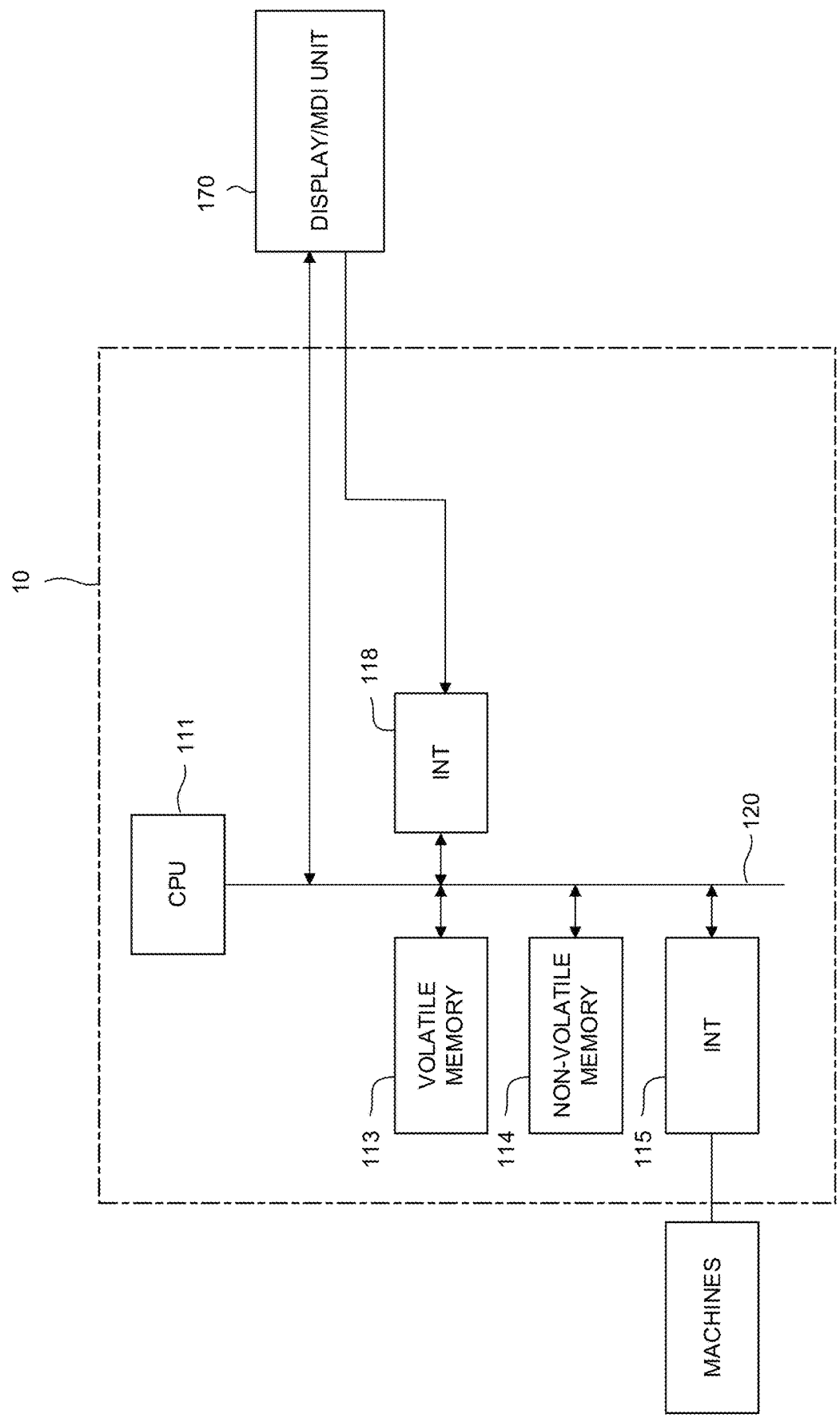
FIG. 1 is a diagram showing a schematic hardware configuration of a cutting condition verification device.

First, a schematic hardware configuration of a cutting condition verification device 10 according to an embodiment of the present invention will be described with reference to FIG. 1.

A CPU 111 of the cutting condition verification device 10 is a processor for generally controlling the cutting condition verification device 10. The CPU 111 reads out a program stored in a non-volatile memory 114 through a bus 120 and controls the entire cutting condition verification device 10 according to the program.

The non-volatile memory 114 is constructed, for example, as a memory that is backed up by a battery (not shown) so that its storage state can be retained even when the cutting condition verification device 10 is powered off. Programs and data stored in the non-volatile memory 114 may be developed in the volatile memory 113 during use. The volatile memory 113 is loaded with temporary calculation data, data input through a display/MDI unit 170, and the like, as well as the programs and data developed from the non-volatile memory 114.

The display/MDI unit 170 is a data input/output device provided with a display, a keyboard, and the like. Command and data input from the keyboard of the display/MDI unit 170 are delivered to the CPU 111 through an interface 118. Moreover, display data output from the CPU 111 is displayed on the display of the display/MDI unit 170 through the interface 118.

An interface 115 is a communication interface for connecting the cutting condition verification device 10 and a machine tool or external equipment.

Figure 2:
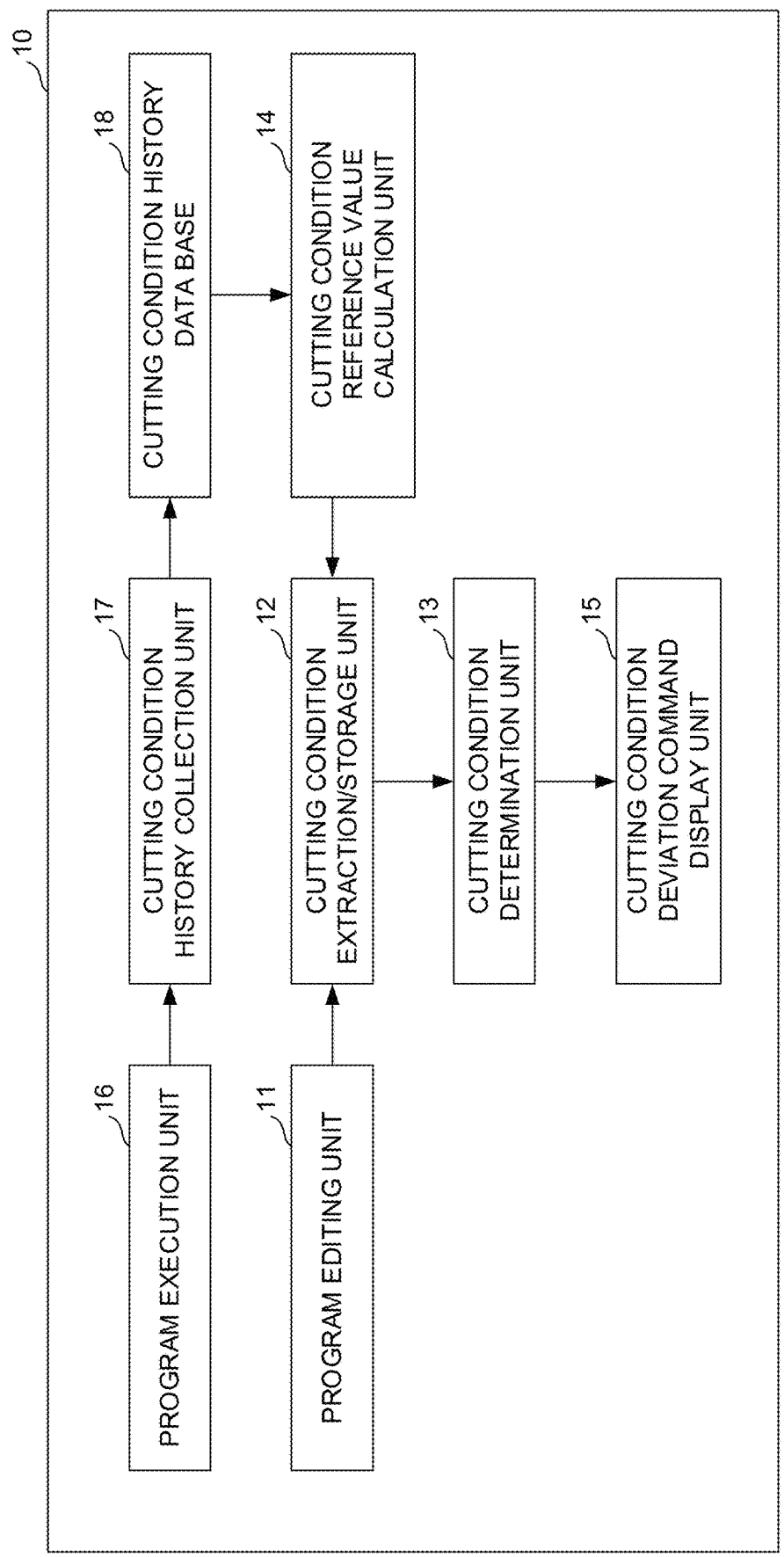
FIG. 2 is a diagram showing a schematic functional configuration of the cutting condition verification device.

Then, a schematic functional configuration of the cutting condition verification device 10 will be described with reference to FIG. 2. The cutting condition verification device 10 may be mounted, for example, on a numerical controller for controlling the machine tool Alternatively, the cutting condition verification device 10 may be mounted on a host device, such as a cell controller, host computer, cloud server, or edge server, connected to a plurality of numerical controllers through a wired/wireless network. In this case, a single cutting condition verification device 10 can detect mistakes in cutting conditions that can be used for the control of machine tools of the numerical controllers.

The cutting condition verification device 10 comprises a program editing unit 11, cutting condition extraction/storage unit 12, cutting condition determination unit 13, cutting condition reference value calculation unit 14, cutting condition deviation command display unit 15, program execution unit 16, cutting condition history collection unit 17, and cutting condition history data base 18. The program editing unit 11 serves to create and edit a machining program (hereinafter simply referred to as the program). The cutting condition extraction/storage unit 12 extracts the cutting conditions from the program. The cutting condition determination unit 13 determines whether or not the cutting conditions fulfill predetermined criteria. The cutting condition reference value calculation unit 14 calculates reference values for determining the propriety of the cutting conditions. The cutting condition deviation command display unit 15 presents those cutting conditions which do not fulfill the predetermined criteria. The program execution unit 16 executes the program. The cutting condition history collection unit 17 collects the cutting conditions at the time of program execution. The cutting conditions collected by the cutting condition history collection unit 17 are accumulated in the cutting condition history data base 18. These processing units are logically implemented as the CPU 111 reads out and executes system programs stored in the non-volatile memory 114.

The program editing unit 11 provides an interface for creating and editing the programs. Typically, the program editing unit 11 creates a new program or edits existing programs stored in the non-volatile memory 114 or read from the interface 115, according to a user's input from the keyboard. Moreover, the programs being created and edited are displayed on the display of the display/MDI unit 170.

The cutting condition extraction/storage unit 12 examines descriptions of programs that are being read, created, or edited by the program editing unit 11 and extracts descriptions related to the tools and the cutting conditions. Moreover, the cutting condition extraction/storage unit 12 acquires the positions (e.g., line numbers in a program table) of the descriptions related to the tools and the cutting conditions. The cutting condition extraction/storage unit 12 temporarily stores information on the extracted descriptions and positions in a storage area (not shown).

The cutting condition determination unit 13 determines whether or not the tools and the cutting conditions extracted by the cutting condition extraction/storage unit 12 fulfill the predetermined criteria. Typically, the criteria for determination are defined by reference values and thresholds indicative of allowable amounts of deviation from the reference values. The reference values and the thresholds are given by a cutting condition reference value calculation unit 14, which will be described below.

The cutting condition reference value calculation unit 14 calculates the reference values with reference to the cutting condition history data base 18 (described later). A method for calculating specific reference values will be described in detail in practical examples described later. Moreover, the cutting condition reference value calculation unit 14 holds the threshold. A predetermined value of the threshold may be stored in advance in a storage area (not shown) or a value input from the keyboard of the display/MDI unit 170 or the like may be used for the threshold.

If the tools and the cutting conditions extracted by the cutting condition extraction/storage unit 12 do not fulfill the predetermined criteria for determination, the cutting condition deviation command display unit 15 presents them to the user. Typically, tables containing the tools and the cutting conditions are displayed on the display of the display/MDI unit 170. Also, a program list containing the tools and the cutting conditions concerned is displayed. If the user then selects the tools and the cutting conditions shown in the tables, corresponding portions (description portions for the tools and the cutting conditions) of the program list can be reached in a jump. Furthermore, if the user edits the tools or the cutting conditions shown in the tables, the contents of the editing can also be reflected in descriptions of the corresponding portions (description portions for the tools and the cutting conditions) of the program list.

The program execution unit 16 outputs commands for executing the programs and operating the tools.

The cutting condition history collection unit 17 extracts the tools and the cutting conditions commanded by a cutting block of the program executed by the program execution unit 16 and accumulates them in the cutting condition history data base 18 (described below). The cutting conditions include, for example, the spindle speed, feed rate, and workpiece material.

The cutting condition history data base 18 is a data base in which the cutting condition history collection unit 17 accumulates the tools and the cutting conditions extracted from the programs executed in the past. Specifically, the tools and the cutting conditions actually used in past machining are accumulated in the cutting condition history data base 18.

Example 1

A cutting condition verification device 10 according to Example 1 extracts and lists descriptions related to those tools and cutting conditions in the program being created and edited which do not fulfill the predetermined criteria. When the user selects elements in the table, corresponding portions (description portions for the tools and the cutting conditions) of the program list is reached in a jump.

An operation of the cutting condition verification device 10 of Example 1 will be described with reference to FIGS. 3 and 4.

Step S101: The program execution unit 16 executes the program. When this is done, the cutting condition history collection unit 17 extracts the tool IDs of the tools and the cutting conditions (spindle speed S, feed rate F, workpiece material, etc.) commanded by the cutting block of the running program and accumulates them in the cutting condition history data base 18.

In the example shown in FIG. 3, a tool ID=23 and a feed rate F=140 are extracted from descriptions "T23" and "G1Z-50.5F140" in the program and stored in the cutting condition history data base 18. Moreover, a tool ID=24 and a feed rate F=200 are extracted from descriptions "T24" and "G1Z-18.F200" in the program and stored in the cutting condition history data base 18. The spindle speed S is extracted from another description in the program.

Step S102: The cutting condition reference value calculation unit 14 calculates the reference values with reference to the cutting condition history data base 18. In this practical example, a mean value of the cutting conditions for each tool and each workpiece material is calculated as the reference value.

In the example shown in FIG. 3, a mean value=1400 of the spindle speeds S and a mean value=147 of the feed rates F are calculated based on a record containing the tool ID=23 and a material=SK. A mean value=1500 of the spindle speeds S and a mean value=140 of the feed rates F are calculated based on a record containing the tool ID=23 and a material=SC50. A mean value=600 of the spindle speeds S and a mean value=196 of the feed rates F are calculated based on a record containing the tool ID=24 and the material=SC50.

Step S103: The program editing unit 11 displays a read program or a program being newly created on the display of the display/MDI unit 170. In this case, an interface (e.g., program check button) for activating a programming mistake check function can be disposed on a screen.

When the program check button is depressed or at a predetermined timing (e.g., at regular time intervals or for each arbitrary event such as program storage), the cutting condition extraction/storage unit 12 extracts the descriptions related to the tools and the cutting conditions and their positions (e.g., line numbers) from the program being displayed and stores them.

The cutting condition determination unit 13 determines whether or not the tools and the cutting conditions extracted and stored by the cutting condition extraction/storage unit 12 individually fulfill the predetermined criteria. In this practical example, the criteria for determination are defined by the reference values calculated in Step 102 and the threshold previously held by the cutting condition reference value calculation unit 14. Specifically, the cutting condition determination unit 13 determines whether or not the cutting conditions fall within a range from the reference value plus the threshold, as an upper limit value, to the reference value minus the threshold, as a lower limit value, around the reference value.

The cutting condition deviation command display unit 15 generates a table containing the tools and the cutting conditions that are determined to be outside the above range and displays it on the display of the display/MDI unit 170. In this case, abnormal values can be highlighted. Moreover, if the abnormal values are selected as selectable values, corresponding portions in the program can be reached in a jump.

In the example shown in FIG. 4, commands are extracted for the tool ID=23 and cutting conditions including a spindle speed S=1200, the feed rate F=140, and the material=SC50. These commands are compared with reference values, the mean value=1500 of the spindle speeds S and the mean value=140 of the feed rates F with the tool ID=23 and the material=SC50, among the reference values calculated in Step 102. The thresholds are assumed to be ±10%. Specifically, if 1350≤spindle speed S≤1650 and 126≤feed rate F≤154 are given, normal values are identified. If not, abnormal values are identified. Among the above commands, the spindle speed S=1200 is determined to be an abnormal value, so that the commands are added to the table by the cutting condition determination unit 13. Among these values, "1200", an abnormal value, for the spindle speed S is highlighted and made selectable.

Based on similar determination, commands using the tool ID=23 and cutting conditions including a spindle speed S=1300, the feed rate F=140, and the material=SC50 are also added to the table. Among these values, "1300", an abnormal value, for the spindle speed S is made selectable. Moreover, commands using the tool ID=24 and cutting conditions including a spindle speed S=580, a feed rate F=170, and the material=SC50 are also added to the table. Among these values, "170", an abnormal value, for the feed rate F is highlighted and made selectable.

Step S104: If an element (i.e., the abnormal value made selectable) in the table displayed in Step S103 is selected by the user, the cutting condition deviation command display unit 15 jumps to a description in the program list corresponding to the selected element. Specifically, the description of the line number of the program corresponding to the selected element is displayed on the display/MDI unit 170. Preferably, in this case, the portion in which the abnormal value is defined in the program should be highlighted.

In the example shown in FIG. 4, the table and the program list are displayed side by side. A record containing the tool ID=23, spindle speed S=1200, feed rate F=140, and material=SC50 is listed up in the table. Among these values, if "1200" for the spindle speed S is selected, a description "G97S1200" of the line in the program list in which the cutting conditions are described is displayed. In this description, "S1200", an abnormal value, is highlighted.

Example 2

If an element in the table is edited, a cutting condition verification device 10 according to Example 2 reflects the contents of the editing in corresponding portions (description portions for the tools and the cutting conditions) of the program list.

An operation of the cutting condition verification device 10 of Example 2 will be described with reference to FIG. 5.

The processes of operation of Steps S101 to S104 are shared with Example 1.

Step S105: If an element in the table displayed in Step S103 is selected by the user, the cutting condition deviation command display unit 15 reflects the editing contents in the description in the program list corresponding to the selected element.

In the example shown in FIG. 4, a record containing the tool ID=24, spindle speed S=580, feed rate F=170, and material=SC50 is listed up in the table. Among these values, if "170", an abnormal value, for the feed rate F is made editable. As shown in FIG. 5, if the user edits the feed rate F and rewrites it to, for example, "150", the cutting condition deviation command display unit 15 rewrites the description of a corresponding portion "G1Z-24.F170" in the program to "G1Z-24.F150".

Example 3

In Example 1, the mean value of the cutting conditions for each tool and each workpiece material is assumed to be a reference value for abnormal value determination. In Example 3, another method for calculating reference values will be exemplified with reference to FIG. 6.

In Calculation Method 1, the mean value of the cutting conditions for each tool and each workpiece material shown in Example 1 is used as a reference value. According to this method, reference values for a tool ID=1 and the material=SC50 are calculated as 1456 and 144 for the spindle speed S and the feed rate F, respectively, based on the cutting condition history data base 18 shown in FIG. 6.

In Calculation Method 2, a mode is used as a reference value for each tool and each workpiece material. According to this method, reference values for the tool ID=1 and the material=SC50 are calculated as 1500 and 140 for the spindle speed S and the feed rate F, respectively, based on the cutting condition history data base 18 shown in FIG. 6.

In Calculation Method 3, a maximum value is used as a reference value for each tool and each workpiece material. According to this method, reference values for the tool ID=1 and the material=SC50 are calculated as 1500 and 150 for the spindle speed S and the feed rate F, respectively, based on the cutting condition history data base 18 shown in FIG. 6.

In Calculation Method 4, an interval between minimum and maximum values is assumed to be a range of normal values for each tool and each workpiece material. Specifically, while the calculated reference value plus/minus a predetermined threshold is given as the range of normal values in Calculation Methods 1 to 3, the range of normal values is given directly without using the threshold in Calculation Method 4. According to this method, the ranges of normal values for the tool ID=1 and the material=SC50 are given by $1400 \leq$ spindle speed $S \leq 1500$ and $140 \leq$ feed rate $F \leq 150$, respectively, based on the cutting condition history data base 18 shown in FIG. 6.

Example 4

The cutting condition verification device 10 according to Example 1 accumulates descriptions related to the tools and the cutting conditions in the programs executed in the past, thereby generating the cutting condition history data base 18. In Example 4, on the other hand, the cutting condition history data base 18 is generated from the descriptions related to the tools and the cutting conditions in the program being created or edited.

In Example 4, Step S201 is performed in place of Step S101. Thereafter, the process of Step S102 and its subsequent processes are performed in the same manner as in Example 1.

Step S201: The program editing unit 11 displays a read program or a program being newly created on the display of the display/MDI unit 170. When this is done, the cutting condition history collection unit 17 extracts the tool IDs of the tools and the cutting conditions (spindle speed S, feed rate F, workpiece material, etc.) commanded by the cutting block of the displayed program and accumulates them in the cutting condition history data base 18.

Preferably, in Example 4, the cutting condition history data base 18 should be created for each program. When this is done, programming mistakes can be determined more accurately if the optimal values of the cutting conditions vary for each machining cycle.

While an embodiment of the present invention has been described above, the invention is not limited to the above-described embodiment or practical examples and may be suitably modified and embodied in various forms.

For example, the cutting condition history data base 18 may be created for each machine (e.g., machine tool to be controlled). When this is done, programming mistakes can be determined more accurately if the optimal values of the cutting conditions vary for each machine.

Moreover, the cutting condition deviation command display unit 15 may be configured to screen-display the reference values, thresholds, and the like together with the table (FIG. 7). When this is done, reference information can be provided for the user to correct abnormal values.

Furthermore, the cutting condition reference value calculation unit 14 may be configured to select any one of the cutting condition history data bases 18 generated in Example 1 (based on all past achievements) and Example 4 (based on the program being created or edited) and that created for each machine and calculate the reference values. When this is done, programming mistakes can be determined more accurately according to various needs and situations.

According to the present invention, the cutting condition verification device 10 compares the tools and the cutting conditions extracted from the programs executed in the past and accumulated with the tools and the cutting conditions described in the program being created or edited. If there are any descriptions exceeding the predetermined criteria in the program being created or edited, the cutting condition verification device 10 lists the descriptions concerned. When this is done, those cutting conditions which are remarkably deviated from past achievements can be automatically discovered, so that the occurrence or non-occurrence of programming mistakes can be easily identified. In this case, high-reliability optimal reference values can be obtained by calculating them from the cutting conditions with an operating experience.

Moreover, the cutting condition verification device 10 can also compare the tools and the cutting conditions extracted from the program being created or edited and accumulated with those described in the program being created or edited. Normally, remarkably different cutting conditions cannot be specified for the same tools and materials in the same program, so that programming mistakes can also be easily discovered by this configuration.

Furthermore, the cutting condition verification device 10 displays descriptions supposed to be programming mistakes as a table. When this is done, only those portions supposed to be programming mistakes can be identified without identifying the entire long program list.

While embodiments of the present invention have been described above, the invention is not limited to the above-described embodiments and may be suitably modified and embodied in various forms.

The invention claimed is:

1. A cutting condition verification device configured to extract a cutting condition setting mistake in a machining program, the cutting condition verification device comprising:
   a processor configured to
      create or edit the machining program,
      extract a cutting condition from the machining program,
      calculate reference values that serves as criteria for determining suitability of the cutting condition, based on a description of another machining program executed in the past,
      determine the suitability of the cutting condition, based on the reference values, and
      cause a display to display the cutting condition determined not to satisfy the criteria in a table form.

2. The cutting condition verification device according to claim 1, wherein the processor is configured to cause the display to highlight the cutting condition determined not to satisfy the criteria in the table form.

3. The cutting condition verification device according to claim 1, wherein the processor is configured to cause the display to display the machining program in a corresponding portion in the table form by jumping to the corresponding portion in response to the cutting condition determined not to satisfy the criteria being selected.

4. The cutting condition verification device according to claim 1, wherein the processor is configured to reflect a content of the editing in a corresponding portion of the machining program in the table form when in response to the cutting condition determined not to satisfy the criteria being edited.

5. The cutting condition verification device according to claim 1, wherein
   the processor is configured to
      execute the machining program,
      collect cutting conditions at a time of execution of the machining program,
      accumulate the collected cutting conditions in a cutting condition history data base, and
      calculate the reference values based on the cutting condition history data base.

6. The cutting condition verification device according to claim 5, wherein
   the processor is configured to calculate a mean value, a maximum value, and a mode for each tool and each workpiece material as the reference values, based on the cutting condition history data base.

7. A cutting condition verification device configured to extract a cutting condition setting mistake in a machining program, the cutting condition verification device comprising:
   a processor configured to
      create or edit the machining program,
      extract a cutting condition from the machining program,
      calculate reference values that serves as criteria for determining suitability of the cutting condition, based on a description of the machining program,
      determine the suitability of the cutting condition, based on the reference values, and
      cause a display to display the cutting condition determined not to satisfy the criteria in a table form.

8. The cutting condition verification device according to claim 7, wherein
   the processor is configured to
      collect cutting conditions from the machining program,
      accumulate the collected cutting conditions in a cutting condition history data base, and
      calculate the reference values based on the cutting condition history data base.

* * * * *